Patented Feb. 4, 1947

2,415,074

UNITED STATES PATENT OFFICE 2,415,074

MANUFACTURE OF CRYSTALLINE MAGNESIUM HYDROXIDE

Leslie M. Clark and John G. Robinson, Northwich, England, assignors to Imperial Chemical Industries Limited, a corporation of Great Britain No Drawing. Application March 17, 1944, Serial No. 526,998. In Great Britain March 17, 1943

2 Claims. (Cl. 23—201)

This invention relates to improvements in the manufacture of crystalline magnesium hydroxide whereby it is obtained in the form of coarse crystals so that it is easily separated from adhering liquor.

In the extraction of magnesium hydroxide from liquors containing magnesium salts many methods have been proposed for precipitating it in special forms which are suitable for different purposes. Most of these have been concerned with separating it in an easily settleable yet reactive form, for which a large crystal size is unsuitable. In most of the known processes for precipitating magnesium hydroxide, the precipitate obtained is flocculent, and in order to avoid breaking up large flocs the agitation employed is gentle. The precipitates obtained by reacting calcined dolomite and a solution of a magnesium salt by known methods have a higher settling rate than those obtained by reacting lime and the same solution by the same methods, due to residual hydrated magnesia from the dolomite which is much more dense than the precipitated magnesium hydroxide. This is one reason why many of the known processes are restricted to the use of calcined dolomite. Other methods which have been described for making magnesium hydroxide include the use of dry calcium hydroxide, prior coating of calcium hydroxide particles with magnesium hydroxide, carrying out the precipitation or slaking in the presence of certain soluble substances, and mixing the reactants with a swirling motion or in wide shallow streams or at an elevated temperature, but in none of these cases is the precipitate obtained in the form of large crystals or crystal aggregates. Specification of British Patent 482,339 describes a process for making crystals which are as big as 5–25 microns diameter and which settle out from the reaction mixture to give a slurry containing 125–175 gms. of magnesium hydroxide per litre, by bringing a carefully prepared slurry of burnt dolomite into contact with an aqueous solution of a magnesium salt, without the application of heat, and at a velocity of flow just sufficient to bring about effective mixing, preferably in the presence of previously formed crystalline magnesium hydroxide.

The object of the present invention is to provide a process for producing magnesium hydroxide from solutions of magnesium salts in a much larger crystal size than has hitherto been possible, thereby facilitating the separation and drying of the precipitate. Another object is to provide an improved process for the manufacture of coarsely crystalline magnesium hydroxide in which it is not necessary to use dolomite.

We have now found that magnesium hydroxide can be prepared in crystals which are much coarser than those hitherto obtainable, without the need for using dolomite, by carrying out the precipitation in intimate contact with a sufficient surface area of existing magnesium hydroxide crystals for substantially all the magnesium hydroxide formed to crystallise on the existing crystals. Such a process involves keeping a large quantity of crystals of magnesium hydroxide relative to the amount being precipitated in unit time, in constant agitation in the immediate vicinity of all points of precipitation.

According to the present invention therefore, we manufacture magnesium hydroxide in a form consisting largely of crystal aggregates exceeding 30 microns diameter by a process which comprises reacting an aqueous solution of a magnesium salt with an aqueous suspension or solution of a hydroxide, the reaction being carried out in a vigorously agitated aqueous suspension of magnesium hydroxide crystals, the weight of said crystals being at least 20 times and preferably between 30 and 100 times the weight of magnesium hydroxide precipitation per hour, and the volume of the reaction zone being sufficient for an average agitation time of the reaction mixture of not less than half an hour and preferably between 1 and 10 hours.

It is essential that the actual precipitation occurs comparatively slowly and in close proximity to a substantial surface area of existing crystals in order that supersaturation of the solution with magnesium hydroxide shall never be high enough to cause the formation of a flocculent precipitate. Thus, we prefer to add the solutions, or maybe suspension in the case of a relatively insoluble hydroxide, separately and simultaneously to an agitated aqueous suspension of magnesium hydroxide crystals, although we can add one reagent to a suspension of magnesium hydroxide crystals in the other reagent. The agitation is an important feature of this crystallisation process. It has hitherto been desirable to restrict the agitation used in processes for the precipitation of magnesium hydroxide, to a mild disturbance of the flocs, just sufficient to keep them in suspension without breaking them up. In the present process we require the best chance of getting the existing crystals at all points of precipitation. Thus we prefer to use stirring or agitation which is sufficiently vigorous to give a substantially equal concentration of crystals throughout the reaction vessel, and this amount of stirring also spreads the zone of precipitation throughout the body of the suspension. The reaction can be carried out at ordinary or elevated temperatures, e. g. 5°-90° C.

The concentrations of the solutions used are not critical, but we prefer to use dilute solutions containing for example 0.2-5.0% by weight as this assists in the avoidance of floc formation. More concentrated solutions, even up to 10%, can be used at correspondingly lower rates of flow, the maximum rate of formation of magnesium hydroxide in a given size of reaction vessel being governed by the maximum weight of seed crystals which can by agitation be brought into the actual zone of precipitation. The aqueous solution or suspension of a hydroxide may conveniently be a dilute solution of sodium hydroxide or a solution or suspension of slaked lime or suspension of slaked calcined dolomite. When using slaked calcined dolomite, the size and properties of the magnesium hydroxide crystals are affected by the presence of residual slaked magnesia. The aqueous solution of the magnesium salt may be any conveniently obtainable solution such as sea water or natural brines. It should be sufficiently free from ions which would cause the formation of other precipitates during the reaction, if the magnesium hydroxide is required pure. Thus, the usual precautions should be taken for the removal of calcium bicarbonate and if desired other compounds from sea water. Equivalent quantities of the reactants may be used, or if desired an excess of either reagent. Thus, when using sea water as the source of magnesium ions, it is sometimes preferable to use a slight deficiency of hydroxide so that only perhaps 80-90% of the total magnesia is precipitated.

The crystalline magnesium hydroxide employed may be naturally occurring brucite or it may be previously formed in an earlier operation. The rate of growth of magnesium hydroxide on these crystals is limited by the surface area available for growth, and in order to obtain a coarsely crystalline product the rate of precipitation must not appreciably exceed the rate of crystallisation on the available surface so that the number of new nuclei formed is small. The actual weight of magnesium hydroxide crystals required in the reaction zone is dependent upon the size of crystals which are being produced. With large crystals there is less surface for growth per unit weight, so that a larger weight is required. In general, for preparing crystal aggregates of 30-60 microns diameter there is required a weight of crystals present equal to about thirty times the weight rate of magnesium hydroxide precipitation per hour. For crystal aggregates of 100 microns diameter about forty times the weight is required. These figures are also affected by the conditions of precipitation. Thus, with continuous operation in a large reaction vessel in which the average retention time of the reaction mixture is several hours, so that the rate of precipitation is low, slightly smaller than the above quantities of crystals present are sufficient.

For comparison, when the volume of the reaction vessel is small, so that the average retention time of the reaction mixture is appreciably less than half an hour, growth of crystal aggregates exceeding 30 microns diameter can only be obtained when there is such a large quantity of crystals present that agitation and conditions of precipitation are difficult. Thus we prefer to use a weight of magnesium hydroxide crystals between 30 and 100 times the weight of magnesium hydroxide precipitated per hour of addition of reactants. The minimum agitation time is also governed by the fact that with shorter times precipitation is incomplete, and after-precipitation of magnesium hydroxide then occurs under conditions which are unsuitable for the growth of crystals, which may contaminate the product with undesirably fine particles. The preferred agitation time is between 1 and 10 hours.

In the preferred method of operating this invention, a dilute solution of a hydroxide such as 0.1-1% caustic soda solution is run continuously into one side of a vigorously stirred reaction vessel. A dilute solution of a magnesium salt, such as sea water from which all the calcium bicarbonate has previously been precipitated, is run continuously into the opposite side of the vessel. In starting up, the vessel may be filled with a suitable suspension of ground brucite; or very slow rates of feed may be run into a small amount of suspension, the rates being increased gradually as a suitable suspension is built up. The rates are then adjusted so that the mixture is retained about 1-10 hours in the reaction vessel. After the reaction vessel is full, the suspension is allowed to flow continuously into a settler from which most of the settled solid is continuously returned to the reaction vessel in order to maintain a thick body of crystals therein, and the clear liquor is discharged. A small portion of the settled solid, equivalent to the amount precipitated, is removed and filtered and dried.

The product obtained by the present process is in coarse crystal aggregates or spherulites which mostly exceed 30 microns diameter, and it is approximately of the same purity as the magnesium hydroxide obtained by the prior process. Individual crystals or crystals composing the aggregates may be 5-20 microns or more in length. The particle size distribution of the product depends on the conditions employed in precipitation, but it may be of a comparatively narrow range of sizes or of all sizes up to, and even above, 150 microns diameter. The advantage of obtaining such coarse crystal aggregates as distinct from the fine crystals or the flocculent precipitate previously obtained is that they can be separated more readily from adhering liquor. When separated by filtration or centrifuging the product has a much lower water content than that hitherto obtainable, and this facilitates the subsequent drying of the product. For example, vacuum filtration yields a filter cake containing over 50% $Mg(OH)_2$, and centrifuging yields a product containing 80-90% $Mg(OH)_2$, whereas the same conditions of filtration applied to the flocculent precipitates hitherto obtainable yield filter cakes containing only 15-25% $Mg(OH)_2$. The material can readily be filtered either cold or hot. The present product can also be settled at a rate exceeding 60 feet per hour and generally of 80-100 feet or more per hour, whereas the known flocculent precipitates obtained industrially usually only settle at a rate of 10-20 feet per hour. After settling for 24 hours the settled material contains at least 30% $Mg(OH)_2$ by weight and generally at least 40% $Mg(OH)_2$. The product is eminently suitable for the manufacture of magnesium metal and refractory materials.

The invention is illustrated but not restricted by the following examples in which the parts are by weight,

Example 1

The reaction vessel employed is a cylindrical tank stirred with a large propellor-shaped stirrer rotating at a peripheral speed of 70 feet per minute (sufficient to create a deep vortex), and fitted with a wide run-off pipe drawn from near the bottom of the vessel and leading upwards to near the top of the outside of the vessel, so that it acts as a settler and an overflow. The tank is practically filled with 400 parts of water at 20° C. and 10 parts of previously formed crystalline magnesium hydroxide, most of which is of particle size 10–20 microns.

The two reactants employed are solutions containing 0.4% NaOH and 0.48% $MgCl_2$ respectively. These solutions are run in at opposite sides of the vessel at the top at rates of 100 parts per hour each, at 20° C. Clear liquor is withdrawn from the overflow, suspension containing some magnesium hydroxide crystals is removed in a bucket from time to time, and the remainder of the precipitated magnesium hydroxide accumulates in the reaction vessel. After 100 hours working the crystal size of the product in the reaction vessel is nearly all 30–40 microns diameter. After a further 100 hours operation the rate of addition of each of the reactants is increased to 400 parts per hour. After a further 100 hours working the crystal size of the precipitate is mostly within the range 60–100 microns. Part of the product is in the form of single crystals, but most of it is in the form of crystalline spherulites. On separating this product from the solution in the reaction vessel by vacuum filtration, a filtercake is obtained which contains 60% $Mg(OH)_2$.

Example 2

The reaction vessel employed is a shallow cylindrical tank of capacity 1000 parts of water, fitted with a paddle stirrer of substantially the same cross-section as the vessel, rotating at a peripheral speed of 25 feet per minute. A gagged run-off pipe is provided at the bottom of the vessel, leading to a settler of the same size as the reaction vessel, and a pump is provided to return the underflow from the settler continuously to the reaction vessel. Into the reaction vessel is put 100 parts of water and 10 parts of brucite of particle size 10–50 microns. Sea water from which bicarbonates have been removed is then run in continuously at one side of the stirred reaction vessel at a rate of 100 parts per hour, and a milk of lime containing 3.3% $Ca(OH)_2$ is run in continuously at the other side at a rate of 10 parts per hour. After the reaction vessel has filled up, the volume in it is kept constant by allowing suspension to flow into the settler. The overflow from the settler is run to waste, and the underflow is pumped back into the reaction vessel continuously at such a rate that most of the solid is kept in the reaction vessel. After 30 hours working, the rates of feeding sea water and milk of lime are increased to 200 and 20 respectively; and after 100 hours working the rates are increased to 400 and 40 respectively. The rate of settling of the solid is now 85 feet per hour. Thereafter, a portion of the underflow from the settler is bled off to a rotary vacuum filter, where 18 parts per hour of filtercake containing 57% $Mg(OH)_2$ is removed.

What we claim is:

1. A process for the continuous production of magnesium hydroxide crystal aggregates exceeding for the major part 30 microns diameter, which comprises continuously introducing an aqueous solution of a magnesium salt and an aqueous hydroxide into a vigorously agitated suspension of magnesium hydroxide crystals in a reaction zone; the magnesium salt and aqueouss hydroxide being added at such a rate that there is always maintained a ratio of at least 20 times the weight of magnesium hydroxide crystals to the weight of additional magnesium hydroxide precipitated per hour; maintaining the reaction mixture in the reaction zone for a time sufficient to assure an average agitation time of not less than half an hour, and then continuously flowing some of the solution containing the magnesium hydroxide crystals so formed into a settling zone.

2. A Process for the production of magnesium hydroxide crystal aggregates exceeding for the major part 30 microns diameter, which comprises introducing an aqueous solution of a magnesium salt and an aqueous hydroxide into a vigorously agitated suspension of magnesium hydroxide crystals in a reaction zone; the magnesium salt and aqueous hydroxide being added at such a rate that there is always maintained a ratio of at least 20 times the weight of magnesium hydroxide crystals to the weight of additional magnesium hydroxide precipitated per hour; maintaining the reaction mixture in the reaction zone for a time sufficient to assure an average agitation time of not less than half an hour and then flowing some of the solution containing the magnesium hydroxide crystals so formed into a settling zone.

LESLIE M. CLARK.
JOHN G. ROBINSON.

REFERENCES CITED

The following references are of record in the file of this patent:

UNITED STATES PATENTS

| Number | Name | Date |
| --- | --- | --- |
| 2,041,047 | Chesny et al. | May 19, 1936 |
| 2,224,708 | Chesny | Dec. 10, 1940 |
| 2,191,560 | Farnsworth et al. | Feb. 27, 1938 |
| 2,045,301 | Langer | June 23, 1936 |
| 1,815,735 | Heath | July 21, 1931 |
| 2,089,339 | Chesny | Aug. 10, 1937 |
| 2,208,185 | Goudge | July 16, 1940 |

FOREIGN PATENTS

| Number | Country | Date |
| --- | --- | --- |
| 482,339 | British | Mar. 24, 1938 |